US012210794B2

(12) United States Patent
Wei et al.

(10) Patent No.: US 12,210,794 B2
(45) Date of Patent: Jan. 28, 2025

(54) MULTIMEDIA REDIRECTION IN COLLABORATIVE SESSIONS ON VIRTUAL DESKTOPS

(71) Applicant: Omnissa, LLC, Mountain View, CA (US)

(72) Inventors: Xing Wei, Beijing (CN); Bo Liu, Beijing (CN); Dongyu Zhao, Beijing (CN); Huanhuan Zhang, Beijing (CN); Hongsheng Li, Beijing (CN)

(73) Assignee: Omnissa, LLC, Mountain View, CA (US)

( * ) Notice: Subject to any disclaimer, the term of this patent is extended or adjusted under 35 U.S.C. 154(b) by 0 days.

(21) Appl. No.: 17/943,197

(22) Filed: Sep. 13, 2022

(65) Prior Publication Data

US 2024/0020081 A1 Jan. 18, 2024

(30) Foreign Application Priority Data

Jul. 14, 2022 (WO) ................ PCT/CN2022/105678

(51) Int. Cl.
*G06F 3/14* (2006.01)
*G06F 9/451* (2018.01)
*H04L 67/141* (2022.01)

(52) U.S. Cl.
CPC ............ *G06F 3/1454* (2013.01); *G06F 9/452* (2018.02); *H04L 67/141* (2013.01)

(58) Field of Classification Search
CPC ..... G06F 3/1454; G06F 9/452; H04L 67/141; G09G 2320/0613; G09G 2360/08; G09G 2360/10; G09G 2370/022
See application file for complete search history.

(56) References Cited

U.S. PATENT DOCUMENTS

| | | | |
|---|---|---|---|
| 11,012,485 B1* | 5/2021 | Hinnant | H04N 21/4437 |
| 11,785,063 B2* | 10/2023 | Janakiraman | G06F 3/0482 |
| | | | 348/14.03 |
| 2011/0197132 A1* | 8/2011 | Escoda | H04L 67/75 |
| | | | 715/733 |
| 2013/0222523 A1* | 8/2013 | Shanmukhadas | H04N 7/147 |
| | | | 348/14.08 |
| 2017/0048282 A1* | 2/2017 | Dharmaji | G06F 3/1454 |
| 2017/0123649 A1* | 5/2017 | Clavel | G06F 3/0485 |
| 2018/0309806 A1* | 10/2018 | Huynh | G06F 3/04886 |
| 2018/0349283 A1* | 12/2018 | Bhatia | H04N 21/431 |
| 2019/0238599 A1* | 8/2019 | Ingale | H04L 65/403 |

* cited by examiner

*Primary Examiner* — Rami R Okasha
(74) *Attorney, Agent, or Firm* — Kim & Stewart LLP

(57) ABSTRACT

A system is described for redirecting multimedia in a collaborative session on a virtual desktop. The virtual desktop session can be established, and collaborator virtual desktop clients can be connected in a collaborative session where each collaborator can view the desktop GUI in their respective virtual desktop client. A request can be received to play media in a media player in the virtual desktop. The media stream can be intercepted in the virtual desktop before it is rendered in the media player and conveyed to each collaborator's client over a separate virtual channel established between the virtual desktop and each collaborator. The data stream can then be rendered in a client media player by each collaborator's client.

18 Claims, 4 Drawing Sheets

MULTIMEDIA REDIRECTION IN COLLABORATIVE SESSIONS ON VIRTUAL DESKTOPS

CLAIM OF PRIORITY

This application is based upon and claims the benefit of priority from International Patent Application No. PCT/CN2022/105678, filed on Jul. 14, 2022, which is incorporated by reference herein in its entirety.

TECHNICAL FIELD

The present disclosure generally relates to virtual desktop infrastructure and more specifically to techniques for multimedia redirection in collaborative sessions on virtual desktops.

BACKGROUND

Virtual desktops provided as part of a virtual desktop infrastructure (VDI) or desktop-as-a-service (DAAS) offerings are becoming more commonplace in today's enterprise work environments. The security of having a remotely stored desktop, ability to access the desktop from any location and on any device, centralized desktop management, efficient use of hardware resources, as well as numerous other benefits made possible by VDI/DAAS are a large benefit for many organizations.

In a conventional VDI or DAAS environment, each user in an enterprise is provisioned a virtual desktop and is allowed to access his or her virtual desktop over a remote network connection, such as a WAN connection. The virtual desktops are typically hosted on servers that reside in a data center of the enterprise or a third-party service provider, and each host server may execute multiple virtual desktops. Users can utilize a client device to remotely log into their individual virtual desktop and all of the application execution takes place on the remote host server which is linked to the local client device over a network using a remote display protocol, such as Remote Desktop Protocol (RDP), PC-over-IP protocol (PCoIP), virtual network computing (VNC) protocol, or the like. Using the remote display protocol, the user can interact with applications of the virtual desktop, which are running on the remote host server, with only the display, keyboard, and mouse information communicated with the local client device. A common implementation of this approach is to host multiple desktop operating system instances on separate virtual machines deployed on a server hardware platform running a hypervisor.

The VMware® Horizon desktop and app virtualization products developed by VMware, Inc. also enable collaborative sessions on a user's virtual desktop, in which a number of collaborators can view the same virtual desktop using a virtual desktop client running on each collaborator's client device. This feature can be useful not only for workplace collaboration but in various other scenarios, such as online helpdesks, remote lecture/class education, etc. For example, to initiate a collaborative session, an owner of a virtual desktop can connect to their virtual desktop using a virtual desktop client running on the owner's client device and invite collaborators to join the virtual desktop session. Each collaborator can launch a virtual desktop client on their own client device and connect to the owner's virtual desktop to view the owner's virtual desktop in their client. This approach has advantages of efficiency and user convenience as existing virtual desktop infrastructure can be utilized for enabling collaborative sessions while allowing users to use virtual desktop clients they may have already installed and are accustomed to using (e.g., to access their own virtual desktops), instead of requiring the users to install and use other conferencing software. However, collaborative sessions on virtual desktops still pose numerous challenges. One such challenge is viewing multimedia in a collaborative session, such as when the virtual desktop owner plays a video in the virtual desktop for sharing with collaborators.

Generally, playing multimedia in virtual desktops can be challenging for numerous reasons, such bandwidth requirements, responsiveness, control, etc. In the non-collaboration setting, the VMware® Horizon products utilize certain multimedia redirection (MMR) features to address such issues. MMR is a feature for improving the quality and efficiency of multimedia that is played in a virtual desktop. For example, when a user plays a video in the virtual desktop, instead of playing the video in a player in the virtual desktop and streaming the GUI updates containing the video images to the client device for the user to see, MMR is used to transfer the raw (e.g., encoded) video data to the client and render the video on the client. This way, because the multimedia stream can be delivered to the client over the network in an efficient (e.g., compressed) format and rendered on the client in a local video player, network bandwidth as well as server processing resources can be conserved, while the user experiences a smoother, higher-quality media experience. This process is known as multimedia "redirection" because the multimedia is redirected to the client device to be rendered there locally instead of rendering the video in the virtual desktop and conveying the virtual desktop GUI with the rendered video imagery to the client.

However, with past technology, when an owner of a virtual desktop established a collaborative session with collaborators and MMR was used to play multimedia (e.g., the owner played a video in the virtual desktop, employing MMR), the multimedia could be redirected to the owner's virtual desktop client using the MMR feature but not to the collaborators' clients. As a result, the collaborators would not receive the redirected media stream and, even worse, instead of seeing a video they may see a blank rectangle displayed in the area of the GUI where the video should play.

What is needed is a more efficient way for performing multimedia redirection in collaborative sessions on virtual desktops.

DETAILED DESCRIPTION

Figure 1:
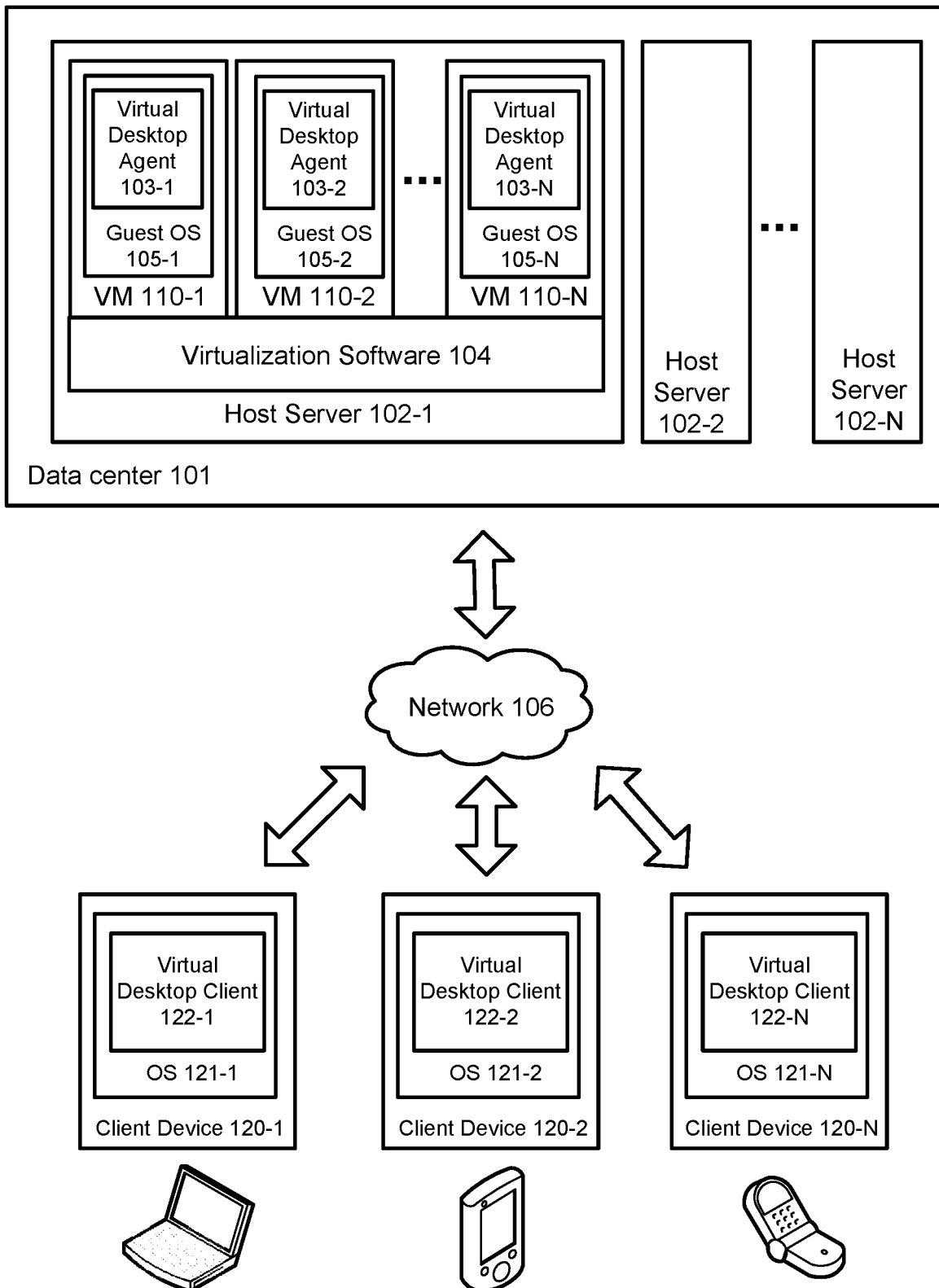
FIG. 1 illustrates an example of a virtual desktop environment, in accordance with various embodiments

Systems and methods in accordance with various embodiments of the present disclosure overcome at least some of the above-mentioned shortcomings and deficiencies by providing ways for multimedia redirection in collaborative sessions on virtual desktops. In particular, embodiments described herein leverage a virtual channel manager that can run in the virtual desktop of a main user, which can establish virtual channels with collaborator virtual desktop clients for conveying redirected multimedia during a collaborative session.

The process can begin with an owner connecting to their virtual desktop and initiating a collaborative session on the virtual desktop with one or more collaborators. During the collaborative session, the owner can interact with the virtual desktop, which can run on a remote server, via the owner's virtual desktop client executing on the owner's client device. Each connected collaborator can also have a virtual desktop client running on their respective client device, which can receive the graphical user interface (GUI) of the virtual desktop and display it to the collaborator in the window of the their virtual desktop client.

In various embodiments, a virtual channel manager can run in the virtual desktop (e.g., in the virtual desktop agent) and establish virtual channels with the owner's and each collaborator's virtual desktop clients for conveying redirected multimedia during the collaborative session. When the owner requests to play certain multimedia (e.g., a video) in a media player in the virtual desktop, the multimedia stream can be redirected and conveyed to the owner's and each collaborators' virtual desktop client over the established virtual channels (the virtual channel manager can multicast the multimedia stream to each virtual desktop client). When the multimedia stream is received in the owner's and collaborators' virtual desktop clients, it can be played in a media player in the virtual desktop client. As a result, multimedia that is played in the virtual desktop can be redirected to the owner's and collaborators' virtual desktop clients during the collaborative session, lending to benefits of efficiency, performance, and user experience.

As used throughout this disclosure in the context of remote desktop environments, the terms, "desktop", "remote desktop", and "virtual desktop" are used interchangeably and refer to an instance of an operating system and/or applications that run(s) remotely with respect to the user. In a conventional VDI or DAAS environment, each virtual desktop corresponds to a virtual machine (VM) executed on a host server (i.e., a host computing device) that is physically located in a remote datacenter. Each host server may host any number of virtual machines (e.g., tens, hundreds, etc.) and each virtual machine may be owned by an individual user. The virtual machine typically includes a guest operating system (e.g., Windows) capable of executing applications for the user and the virtual machine is used to provide a virtual desktop for the individual user. The user who owns the virtual desktop can remotely log into his or her virtual desktop using a client device that establishes a network connection (e.g., Wide Area Network connection) with the host server and remotely execute various applications on the virtual machine as if the desktop was running on the user's local client device. The client device can be any computing device capable of establishing a network connection, including but not limited to personal computers (PCs), laptops, mobile phones, tablet computers, wearable devices (e.g., smart watches, electronic smart glasses, etc.) or the like.

When a client device is accessing a remote desktop using a remote display protocol (e.g., RDP, PCoIP, VNC, etc.), the graphical user interface (GUI) of the desktop is generated on the server, the GUI image data is then encoded and transmitted over the network to the client device, where it is decoded and displayed to the user. For example, in one embodiment, the framebuffer pixel data on the server is encoded using a codec, such as H264, and transmitted over an Internet connection to the client, where the data is decoded and rendered on a local display screen to the user. Similarly, any user input information, such as keyboard and mouse events, is transmitted from the client device to the server over the network connection, where it may in turn cause various updates to the GUI of the remote desktop. In this manner, the user is able to view the GUI of the remote desktop and interact with it as if the desktop was actually running on the local client device, even though the desktop is actually executing remotely.

FIG. 1 illustrates an example of a virtual desktop environment, in accordance with various embodiments. The virtual desktop environment, such as VDI or DAAS environment, includes host servers (102-1, 102-2, 102-N) that are communicatively coupled with a number of client devices (120-1, 120-2, 120-N) via a network 106. Network 106 may be a wide area network (WAN), or other form of remote communication link between the host servers (102-1, 102-2, 102-N) and client devices (120-1, 120-2, 120-N). Network 106 may further include numerous other components, such as one or more firewalls, connection brokers, management servers, etc., which are not shown here so as not to obscure salient features of the remote desktop environment. Host servers (102-1, 102-2, 102-N) may physically reside in a data center 101 of the enterprise (e.g., in case of VDI) or in a data center of a third-party service provider (e.g., in case of DAAS).

By way of illustration, host server 102-1 can interoperate with client devices (120-1, 120-2, 120-N) to provide virtual desktop services to users of client devices (120-1, 120-2, 120-N). For example, host server 102-1 can host, for each user, a desktop that is presented by a guest operating system (such as one of the guest operating systems 105-1, 105-2, 105-N) running on a virtual machine (such as one of the virtual machines 110-1, 110-2, 110-N) on host server 102-1. In this context, the terms "desktop", "remote desktop", and "virtual desktop" refer to a computing environment in which a user can launch, interact with, and manage the user's applications, settings, and data. Each client device (120-1, 120-2, 120-N) can allow a user to view on a desktop graphical user interface (on a local display device) his/her desktop that is running remotely on host server 102-1, as well as provide commands for controlling the desktop. In this manner, the users of client devices (e.g., 120-1, 120-2, 120-N) can interact with the desktops hosted on host server 102-1 as if the desktops were executing locally on client devices (120-1, 120-2, 120-N).

In the embodiment of FIG. 1, host server 102-1 includes virtualization software 104 that supports the execution of one or more virtual machines (VMs) (e.g., 110-1, 110-2, 110-N). The virtualization software 104 may be a hypervisor, a virtual machine manager (VMM) or other software that allows multiple virtual machines to share the physical resources of the server. In the illustrated embodiment, each virtual machine (e.g., 110-1, 110-2, 110-N) can execute a guest operating system (e.g., 105-1, 105-2, 105-N) that hosts a desktop for a single user at a time. For example, if five users connect to host server 102-1 for the purpose of initiating remote desktop sessions, the host server 102-1 can launch five VMs, each hosting one desktop for each one of the five users. These types of virtual desktop environments where user desktops are hosted within separate, server-side virtual machines are often referred to as virtual desktop infrastructure (VDI) or Desktop-as-a-Service (DAAS) environments.

In such virtual desktop environments, each client device (e.g., 120-1, 120-2, 120-N) can execute a virtual desktop client (e.g., 122-1, 122-2, 122-N). For example, the virtual desktop client (e.g., 122-1, 122-2, 122-N) can be a stand-alone, designated client application ("native client"), or a web browser ("web client"). In some cases, a standard web browser may be modified with a plugin to operate as a web client. The interaction between the virtual desktop and the client device can be facilitated by such a virtual desktop client (e.g., 122-1, 122-2, 122-N) running in the OS (e.g., 121-1, 121-2, 121-N) on the client device (e.g., 120-1, 120-2, 120-N) which communicates with a server-side virtual desktop agent (e.g., 103-1, 103-2, 103-N) that is running on the guest OS inside the virtual machine (e.g., 110-1, 110-2, 110-N). In particular, the interaction can be performed by the virtual desktop agent transmitting encoded visual display information (e.g., framebuffer data) over the network to the virtual desktop client and the virtual desktop client in turn transmitting user input events (e.g., keyboard, mouse events) to the remote desktop agent.

It should be noted that the particular virtual desktop environment illustrated in FIG. 1 is shown purely for purposes of illustration and is not intended to be in any way inclusive or limiting to the embodiments that are described herein. For example, a typical enterprise VDI deployment would include many more host servers, which may be distributed over multiple data centers, which might include many other types of devices, such as switches, power supplies, cooling systems, environmental controls, and the like, which are not illustrated herein. Similarly, a single host server would typically host many more virtual machines than what is shown in this illustration. It will be apparent to one of ordinary skill in the art that the example shown in FIG. 1, as well as all other figures in this disclosure have been simplified for ease of understanding and are not intended to be exhaustive or limiting to the scope of the invention.

In various embodiments, multiple users can engage in a collaborative session on a virtual desktop. In a collaborative virtual desktop session, multiple virtual desktop clients can be connected to a single virtual desktop and the virtual desktop agent can be configured to send the virtual desktop GUI to each client. Such a collaborative virtual desktop session can be initiated by the owner of the virtual desktop logging into their virtual desktop and sending invitations to collaborators (via a collaboration application or collaboration feature in the virtual desktop agent/client). The collaborators can then accept the invitations and have their virtual desktop clients routed to the virtual desktop to join the collaborative session so they can view the owner's desktop. This approach is convenient in many settings, however, as mentioned above, collaborative sessions using past technologies had certain limitations, such as the lack of multimedia redirection support.

Generally, with multimedia redirection (MMR), when a user plays a multimedia stream in the virtual desktop, the multimedia stream is transferred and decoded on the client system. The client system plays the media content providing various benefits, such as reduced load on the host server, lower bandwidth requirements, and improved (smoother) media performance. For example, without the user of MMR, when a user plays a video on a remote virtual desktop, screen updates are continuously sent to the client side. Particularly with high resolution video, this can require rapid transfer of large data, which often overwhelms available network bandwidth. To avoid such issues, MMR is used to send the raw video stream to the client side over a side/virtual channel and let the client side use its own computing capabilities to render the video on client side, thereby reducing bandwidth consumption and decreasing use of the agent side resources to perform screen rendering. With MMR, client-side CPU and GPU resources can be used instead to render the video. As a result, bandwidth and agent-side computing burden is reduced, and the media playback quality is smoother. However, as mentioned before, with previous technologies this feature was not available for collaborative session so, for example, when a main user (e.g., desktop owner) played media during a collaborative session, if the media was redirected to the owner's client via MMR, the remaining users may not see the video because it would not be redirected to collaborator clients.

Figure 2:
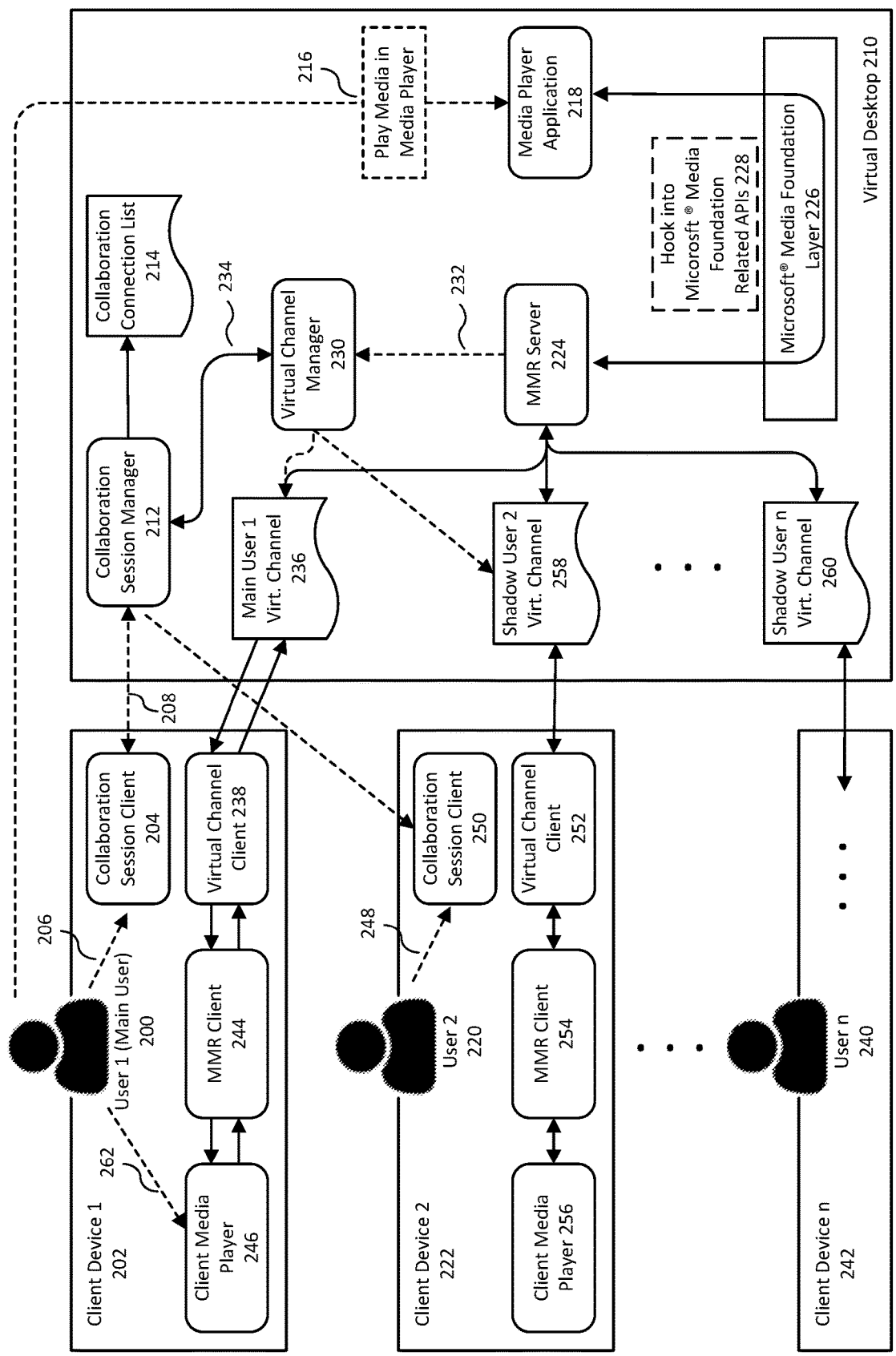
FIG. 2 illustrates an example architecture of a system for multimedia redirection in collaborative sessions on virtual desktops, in accordance with various embodiments.

FIG. 2 illustrates an example architecture of a system for multimedia redirection in collaborative sessions on virtual desktops, in accordance with various embodiments. As illustrated in the example of FIG. 2, user 1 (main user) 200 of client device 1 202 can connect to a virtual desktop 210 and establish a collaborative session with multiple users (e.g., user 2 220 of client device 2 222 through user n 240 of client device n 242).

In various embodiments, user 1 200 can connect to the virtual desktop 210 and invoke the collaborative session via a collaboration session client 204, as illustrated by arrow 206. For example, the user can use a virtual desktop client (which is not illustrated so as not to obscure the salient parts of the inventions) running on client device 1 202 to connect to a virtual desktop agent (which is also not illustrated so as not to obscure the salient parts of the inventions) running in the virtual desktop 210 and establish a virtual desktop session on the user's 200 virtual desktop 210, and then user 1 200 can invoke a collaborative session on their desktop 210 via the collaboration session client 204.

The collaboration session client 204 can interoperate with a collaboration session manager 212 on the virtual desktop 210 to initiate and enable collaboratives sessions on the virtual desktop 210. In an embodiment, the collaboration session client 204 can be a module or a feature in the virtual desktop client and the collaborative session manager 212 can be a module or feature in the virtual desktop agent. In an embodiment, the collaboration session client 204 can be an application running on client device 1 202 and the collaborative session manager 212 can be an application running on the virtual desktop 210.

For example, the user can request, via the collaboration session client 204 (as illustrated by arrow 206) to establish a collaborative session with certain users (e.g., user 2 220 through user n 240). In various embodiments, the collaboration session client 204 can provide a user interface to user 1 200, allowing the user to request a collaborative session with selected collaborators. For example, user 1 200 may be able to specify users to invite from a list of registered users, by providing e-mails addresses, usernames, or any other kind of identifying information.

After user 1 200 invokes and requests the collaborative session, the collaboration session client 204 can communicate with the collaboration session manager 212 on the agent side (illustrated by arrow 208) and the collaboration session manager 212 can create a collaboration connection list 214 that can identify and track active collaborator connections. The collaboration session manager 212 can also flag or mark user 1 200 as the "main" user in the collaboration connection list 214 to indicate that user 1 200 should be permitted to control redirected media, while other users should be restricted, as will be described in more detail below.

In various embodiments, user 1 200 can request to play media in a media player application 218 running in the virtual desktop 210 (illustrated by labeled arrow 216). For example, user 1 200 can produce an input (e.g., clicking on an executable media file, etc.) in the virtual desktop 210 requesting to play a video or audio file in a media player application 218, such as a Windows® Media Player.

In various embodiments, after the media player 218 is prompted to play the media, a multimedia redirection (MMR) server 224 running on the virtual desktop 210 (which can be a module that is part of the virtual desktop agent) can intercept the media data stream before it is rendered in the media player application 218 (e.g., by tapping into the media player application 218 APIs) in order redirect the media data stream.

In the example of FIG. 2, the media player application 218 can be a Windows® Media Player although, as will be appreciated by those skilled in the art, the invention can be performed with any other types of suitable media players and the Windows® Media Player implementation is only provided by way of example. In the Windows® Media Player application, various operations such as multimedia launching, playing, rendering, decoding, etc. happen under the Microsoft® Media Foundation set of function calls. In various embodiments, the MMR server 224 can hook 228 into the Microsoft® Media Foundation-related APIs (Application Programming Interfaces) to tap into the Microsoft® Media Foundation layer 226. Consequently, when user 1 100 request to play media in the media player application 218, the media player application 218 can request the corresponding media stream which can call the Microsoft® Media Foundation functions. This call to the Microsoft® Media Foundation functions can in turn call out or trigger (e.g., via the hooks 228) the MMR server 224, which in response can retrieve (or intercept) the media stream raw data (e.g., before it is rendered in the media player 218) so that data stream can be transferred through virtual channels (e.g., protocol virtual channels) to the client side to be decoded and rendered there (as will be described in further detail below). Thus, in various embodiments, the media player application 218 can tap into the Microsoft® Media Foundation 226 APIs for media stream handling, and the MMR server module 224, which can be hooked 228 into this layer 226, can be loaded and start to work (the MMR server 224 can have a set of functions hooked to the Microsoft® Media Foundation 226 APIs in preliminary steps, such as during session preparation).

While the example of FIG. 2 illustrates intercepting a media stream in a Windows® Media Player, it will be appreciated by those skilled in the art that similar or different techniques can be utilized with different types of media players to intercept media data streams to perform multimedia redirection and this invention is not limited to any particular technique, computing environment, or media player type. For example, in various embodiments, multimedia redirection can be performed by intercepting a media data stream before the data stream is rendered in different types of media players in virtual desktops and sending the media stream to connected collaborator virtual desktop clients to be rendered in client-side media players in each virtual desktop client.

In various embodiments, the video stream can be intercepted when it is in a compressed or encoded format, before it is rendered in the virtual desktop media player (e.g., 218). In various embodiments, the system can prevent the video from showing in the virtual desktop GUI (e.g., to avoid GUI screen updates with the video images from being sent to the client) by preventing the intercepted stream from being rendered in the virtual desktop media player (e.g., 218) or, if the video is allowed to be rendered in the agent-side media player, then the area where the video appears in the virtual desktop GUI can be covered (e.g., by a solid rectangle) so that the video imagery is not displayed in the GUI.

In various embodiments, the MMR server 224 (e.g., after it is triggered and starts to work) can initiate or trigger a virtual channel manager 230, which can be a module in the virtual desktop agent or elsewhere in the virtual desktop 210. The virtual channel manager 230 can begin working on data channel management, as indicated by arrow 232. The virtual channel manager 230 can communicate with (e.g., send a request to) the collaboration session manager 212 to retrieve session information in the collaboration connection list 214 (illustrated by arrow 234).

After retrieving the session information in the collaboration connection list 214, the virtual channel manager 230 can create a virtual channel for each client connected to the collaborative session. Each virtual channel can be a protocol virtual channel or a side channel (e.g., a channel separate from the typical channels used for interacting with the virtual desktop such as for remoting user inputs and the GUI). For example, the virtual channel manager 230 can determine from the collaboration connection list 214 that client device 1 202 (or the virtual desktop agent on client device 1 202) is connected to the virtual desktop 210 and in response create a main user 1 virtual channel 236 for client device 1 202. The virtual channel manager 230 can then establish a connection over the main user 1 virtual channel 236 to an MMR client 244 on client device 1 202 via a virtual channel client 238. The data stream retrieved (or intercepted via hooks 228) from the media player application 218 can then be transfer to the MMR client 244 by the MMR server 224 over the virtual channel 236.

In various embodiments, the virtual channel client 238 can be a module on client device 1 202 (e.g., in the virtual desktop client) responsible for establishing virtual channels and receiving/sending information over the virtual channels, such as data streams and media player input commands.

In various embodiments, the MMR client 244 can be a module on client device 1 202 (e.g., in the virtual desktop client) responsible for managing multimedia redirection on client device 1 202.

After receiving the redirected media stream, the MMR client 244 can create a client media player 246 and play the redirected media stream in it. For example, the MMR client 244 can launch the client media player 246 and play the received media stream in it. In various embodiments, if the media is a video for example, the MMR client 244 can place the window of the client media player 246 superimposed over the virtual desktop 210 GUI that is received from the virtual desktop 210.

In various embodiments, media player 218 metadata information such as video rectangle (window) size, volume settings, and so on can be conveyed to the client through the data channel 236 and the MMR client 244 can adjust the corresponding client media player (e.g., make rectangle size and volume adjustments) based on the received metadata information. When the metadata information changes (e.g., due to user 1 200 making a change), an update can be sent to the client with the updated information and the MMR client 244 can update its corresponding client media player 246 based on the updates.

In various embodiments, client device 2 222 can contain the same or similar components as client device 1 202, such as a collaboration session client 250, a virtual channel client 252, an MMR client 254, and a client media player 256, all of which can perform analogous functions as the components in client device 1 202, except as otherwise indicated. As illustrated by arrow 248, user 2 220 of client device 2 222 can request to connect to a collaboration session on the virtual desktop 210. For example, user 2 220 can use a collaboration session token and launch the collaboration session client 250 to request to connect to the collaboration session. In various embodiments, user 2 220 can receive the collaboration token in an invitation sent to user 2 220 (e.g., by user 1 200) in an email, via chat, or any other suitable means. Using the token, the collaboration session client 250 can be routed to the virtual desktop 210 and request to connect user 2 220 to the collaboration session.

After the collaboration session client 250 is routed to the virtual desktop 210, it can communicate with the collaboration session manager 212 to join user 2 220 to the collaborative session (e.g., the virtual desktop client of client device 2 222 can be connected to the collaborative session on the virtual desktop 210). Once user 2 is joined to the collaborative session, they may be able to view the virtual desktop GUI 210 that can be streamed to the virtual desktop client of client device 2 222 be the virtual desktop 210 agent. However, further steps can be taken to enable media redirection for client device 2 222.

After the user 2 220 connection to the collaborative session is established, the user 2 220 connection can be registered in the collaboration connection list 214. The virtual channel manager 230 on the virtual desktop 210 can be notified (e.g., by the collaboration session manager 212) that a new user (i.e., user 2 220) has been registered for the collaborative session (i.e., added to the collaboration connection list 214) and in response it can create a new virtual channel (user 2 virtual channel 258) and establish a connection with the virtual channel client 252 over the newly established virtual channel 258, which can be marked as a shadow connection (e.g., to indicate that the user is not entitled to control). Then, the MMR server 224 can multicast the data stream intercepted at the medial player 218 to each established virtual channel (e.g., to the main user 1 virtual channel 236 and to the shadow user 2 virtual channel 258).

In a similar way as was described above with respect to client device 1 202, the MMR client 254 on client device 2 222 can receive the data stream, create a client media player 256, and play the stream transferred from the agent in the client media player 256.

In the same way, if any additional users (e.g., user n 240) are connected to the virtual desktop 210 for the same collaborative session, the system can create an additional shadow user n virtual channel 260 with the new client and convey the data stream to be played on client device n 242 in the same way. The data stream can then be multicasted to each client device 202, 222, 242, via the corresponding virtual channel 236, 258, 260.

In various embodiments, media player 218 metadata information such as video rectangle size, volume settings, and so on can be conveyed to each connected client through the corresponding data channel (e.g., 236, 258, 260) and the MMR client (e.g., 244, 254) operating in each client can adjust the corresponding client media player (e.g., make rectangle size and volume adjustments) based on the received metadata information. When the metadata information changes (e.g., due to user 1 200 making a change), an update can be sent to each client with the updated information and each MMR client can update its corresponding client media player based on the updates.

In various embodiments, user 1 200 can trigger a client-side action command in the client media player 246, as illustrated by arrow 262. For example, the action 262 can be a control input in the media player such as a seek command, a play/pause command, a window-resize input, volume change, etc. It should be noted that such control inputs into a client-side media player (e.g., client media player 246) can be handled utilizing a different mechanism than how general user inputs in the virtual desktop 210 are handled because the client media player 246 is running locally on client device 1 202 and so the inputs may not be interpreted if they are translated to the agent side via regular channels. In various embodiments, to effectuate such commands, the commands can be conveyed back to the MMR server 224 via the virtual channel 236 and be injected into the medial player application 218 (e.g., by hooking into the media player application 218 APIs) to be effectuated in the media player 218.

When the user produces the client-side action 262 in the client media player 246, the MMR client 244 can receive the command and convey it to the MMR server 224 over the main user 1 virtual channel 236 via the virtual channel client 238. In various embodiments, the system can configured to only allow certain user to control the media. For example, in a collaboration environment, the ability to control the media player may need to be limited so that only specific users, such as user 1 200 or users with control enabled (or users designated as having control permission, etc.) could have the ability to send the control commands to the media player 218. This can be identified with a flag as mentioned, such that only the user connected with the flag is enabled with control to send commands to the media player 218. When the user with the flag performs a control command, the corresponding action can be performing in the media player 218 and the resulting updates translated to all connected clients in the collaboration session.

Accordingly, when the MMR server 224 receives the command, it can first determine whether the user from which the command is originating is entitled to make inputs. The MMR server 224 can identify that the command is from the main user 1 virtual channel 236 and determine that it can be permitted (e.g., by checking that the main user 1 virtual channel 236 and/or user 1 200 are flagged in the collaboration connection list 214. Then, then MMS server 224 can call the Microsoft® Media Foundation APIs to perform the requested command in the media player application 218. In embodiments utilizing other media players, the MMR server 224 can similarly make a call or a request to such media player to effectuate the command produced by user 1 200 in the media player.

In various embodiments, if a user whose connection is not flagged (e.g., user 2 220) makes a client-side action command into the local client media player 256, the MMR server 224 can receive the command (e.g., it being conveyed via the shadow user 2 virtual channel 258) and determine that user 2 and/or the shadow user 2 connection is not flagged. In response, the MMR server 224 can block or ignore the command.

As illustrated in the example of FIG. 2, during the collaboration session, user 1 200 can play media in the virtual desktop 210 media player 218 and the corresponding media stream can be redirected and conveyed (multicast) to each collaborator's (e.g., user 1 200, user 2 220, and user n 240) client device to be rendered there in a local client media player (e.g., 246, 256). In various embodiments, the collaboration session manager 212 can maintain and update the collaboration connection list 214, which can track active collaborator connections to monitor the life cycle of each collaborator connection. Each time a new collaborator connection is established with a new virtual desktop client, the collaboration session manager 212 can inform the virtual channel manager 230, which in response can establish a new data channel (such as virtual channels 258 and 260) with the new virtual desktop client (e.g., via virtual channel client on the virtual desktop client), and the data channel can exist for the duration of the connection. Similarly, each time a collaborator connection is terminated, the collaboration session manager 212 can inform the virtual channel manager 230 and the corresponding virtual channel connection can be terminated by the virtual channel manager 230.

Figure 3:
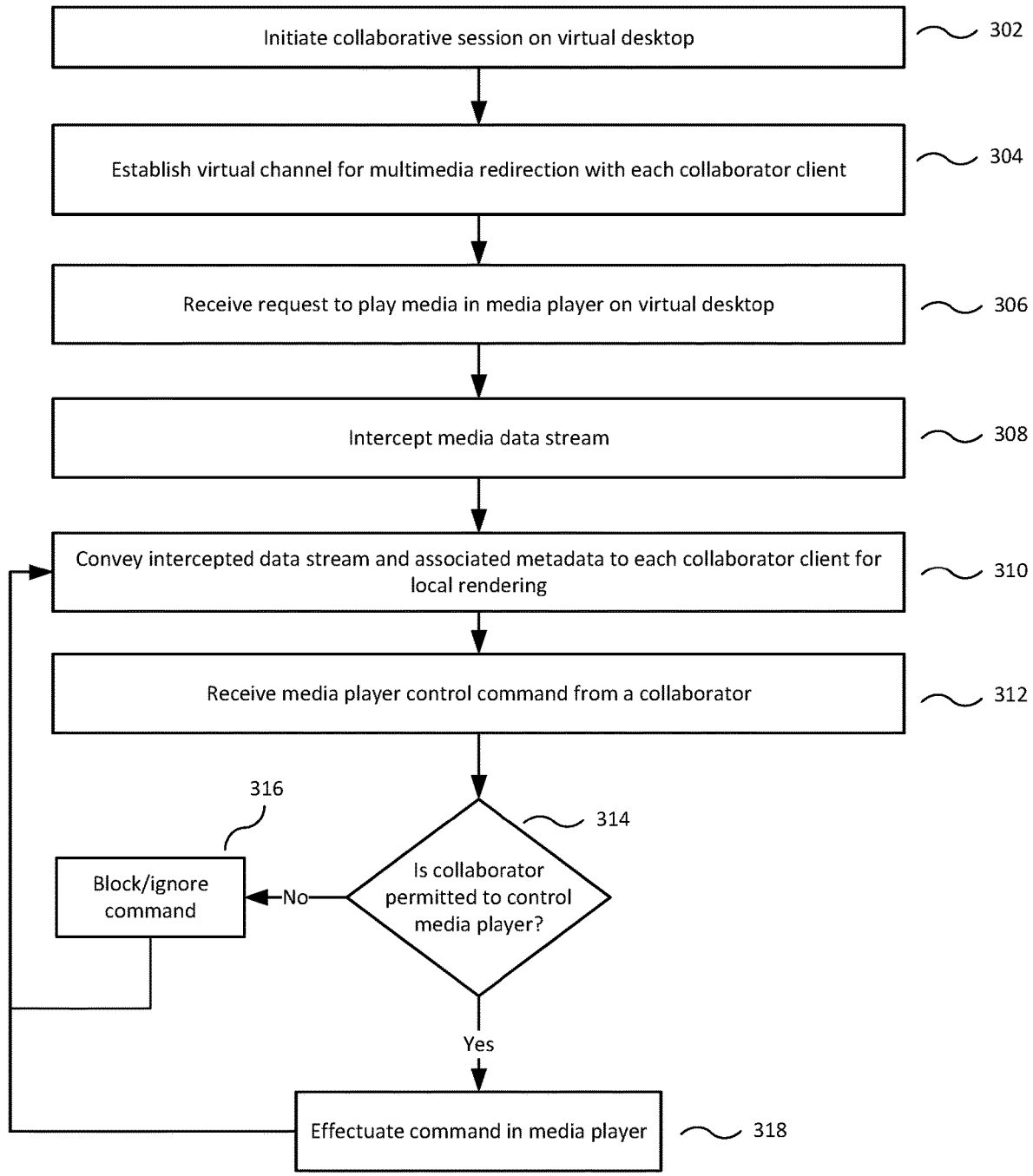
FIG. 3 illustrates an example process flow for multimedia redirection in collaborative sessions on virtual desktops, in accordance with various embodiments.

FIG. 3 illustrates an example process flow for multimedia redirection in collaborative sessions on virtual desktops, in accordance with various embodiments. The process can begin in operation 302, where a collaborative session is initiated on a virtual desktop. For example, a user (the virtual desktop "owner") can log into their virtual desktop and invite multiple collaborators to join in a collaborative session on the virtual desktop. Once the collaborators are joined to the collaborative session, a virtual desktop agent in the virtual desktop can send the virtual desktop GUI to each collaborator's (including the owner's) virtual desktop client running on their respective client device.

In operation 304, a virtual channel for multimedia redirection can be established by the virtual desktop agent with each collaborator's (including the owner's) virtual desktop client. For example, the virtual desktop agent can identify each collaborator virtual desktop client connected to the collaboration session (e.g., based on a collaboration connection list) and establish a virtual channel, which can be a protocol virtual channel or a side channel, with each identified client.

In operation 306, a request can be received in the virtual desktop to play media in a media player. For example, the owner can request to play a video or other type of multimedia file in the virtual desktop.

In operation 308, a data stream corresponding to the requested media can be intercepted. For example, the data stream can be intercepted in the media player before it is rendered using a mechanism such as hooks.

In operation 310, the intercepted data stream along with associated metadata can be conveyed (i.e., multicast) to each collaborator's client (including the owner's client) for local rendering. For example, the virtual desktop agent can replicate the intercepted data stream and convey it to each collaborator's virtual desktop client over the formed virtual channels along with associated metadata, which can include information such as the video window size, volume setting, etc. Once received, the data stream can be rendered by each collaborator's virtual desktop client in a local media player, taking into account the associated metadata to adjust parameters such as window size, volume, etc. For example, received window size information can be used by the virtual desktop client to correctly adjust the size of the client media player window that is placed over the received GUI (e.g., to match the size of the media player in the virtual desktop). The window size information in the metadata can corresponding to the window of the media player in the virtual desktop GUI (e.g., its size). Then, each of the virtual desktop clients receiving this information can adjust the window size of the client media player based on the received window size information when rendering the media stream.

In operation 312, the virtual desktop agent can receive a media player control command from a collaborator. For example, the command can be to resize the window, seek, change volume, etc. In operation 314, a determination is made of whether the requesting collaborator is permitted to control the corresponding media player. For example, the agent can check whether the collaborator's connection is flagged or marked as being enabled (having permission, being designated, etc.) for media control. If a determination is made that the collaborator is not permitted to control the media player, then in operation 316, the command can be blocked or ignored. The process can then return to operation 310, where the intercepted data stream along with associated metadata can be conveyed to each collaborator's client (including the owner's client) for local rendering.

If, on the other hand, a determination is made that the collaborator is permitted to control the media player, then in operation 318, the command can be effectuated in the media player by changing window size, seeking, changing volume, etc., as may be requested by the collaborator. The process can then return to operation 310, where the intercepted data stream along with associated metadata can be conveyed to each collaborator's client (including the owner's client) for local rendering. The metadata may now be updated to reflect any changes produced by the collaborator's command.

Figure 4:
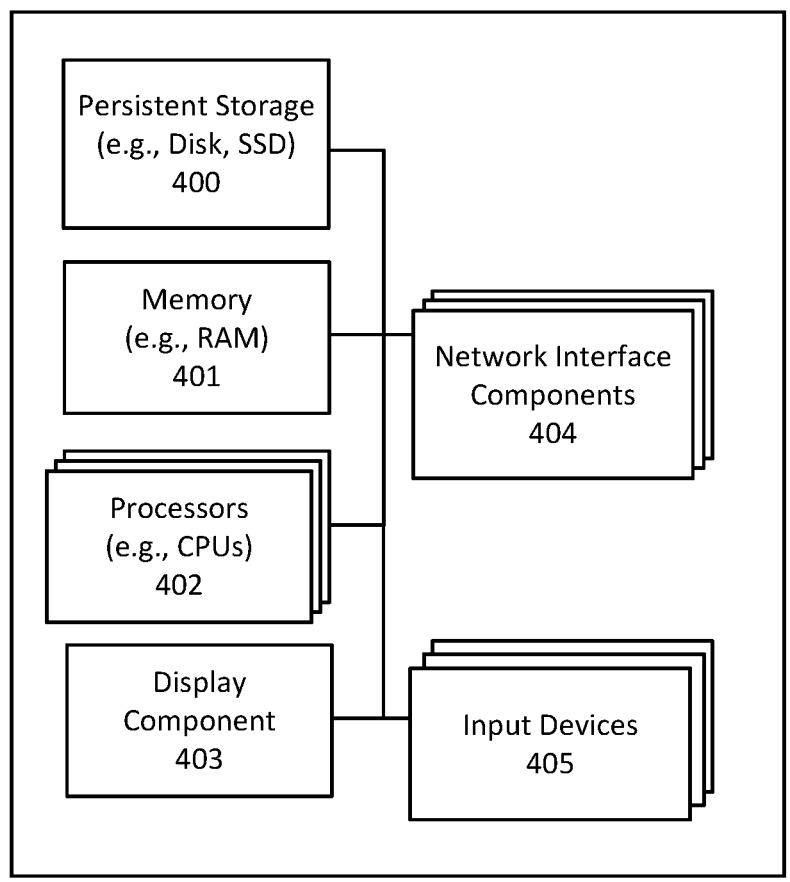
FIG. 4 illustrates an example process flow for capturing applications in an ASV and rearranging the block sequence for efficient pre-caching, in accordance with various embodiments.

FIG. 4 illustrates an example process flow for capturing applications in an ASV and rearranging the block sequence for efficient pre-caching, in accordance with various embodiments. In operation 402, the applications are installed on a capture machine, which may be a virtual machine. In operation 404, the installed applications are captured in an ASV. This can be performed by attaching a writable disk to the capture machine and redirecting all file/registry creation and modifications to that disk, such that when an application is installed, all its content gets captured on that disk. In operation 406, each application is launched from the ASV on the capture machine, one by one. In operation 408, accesses made by each application during launch are monitored and recorded. In operation 410, the data blocks in the ASV are rearranged sequentially in the order that the blocks were accessed during the launch. In operation 412, an application manifest identifying the data blocks (e.g., identifying the location of the blocks on the ASV) used by each application during launch is produced. The application manifest is then stored in the ASV along with the application.

In various embodiments, the system can be further configured to preserve application pre-cached pages and data when available memory is low, e.g., when the cache gets filled up. For example, when the system detects that available cache is running low, it can move application pre-cached pages from the cache to secondary storage. The secondary storage can be local storage on the virtual machine, such as SSD-based local storage at the hypervisor. Because the secondary storage is still local, accessing the pre-cached pages there can offer significant advantages over accessing the content back on the ASV, particularly when the ASV is on remote storage.

Thus, when the system detects that cache is low, or that an application's pre-cached blocks are to be evicted from cache, the system can move those blocks to such secondary storage. When the application is launched by the user, the pre-cached blocks can be accessed by the application in the secondary storage instead of in cache—which may still be significantly more efficient than accessing them on the ASV over the network. In an embodiment, existing functionality of operating systems can be leveraged to preserve application pre-cached pages and data when available memory is low in this way.

For example, in the Windows OS, the Windows Virtual Memory Manager moves less-frequently used pages into a paging file in secondary storage to free up memory when the system is under low memory conditions. The system can be configured to store these page files at secondary local storage at the hypervisor, such as an SSD-based local storage at the hypervisor. If the desktop has such a local page file, it will not need to close the mapped executable files after priming (i.e., it will not have to evict the pre-cached blocks). Instead, when the system is under memory pressure, the Windows Virtual Memory Manager can move the application pre-cached pages/blocks to the local page file (e.g., on the SSD at the hypervisor). Then, when the user launches the application, the application can read those pages from the page file instead of the ASV, thus skipping network overhead if the ASV is network-based.

When virtual desktops are not equipped with such local SSD-based page file storage, the system can be configured so that it closes the memory mapping for the application blocks, but the memory manager does not immediately free those block pages; instead, it moves them to a standby list. The memory manager will only free-up the prefetched blocks from the standby list when the system is under low-memory conditions.

In various embodiments, the techniques descried herein can be utilized for delivering applications in ASVs to physical computing devices. In the physical computing device scenario, the ASV can be mounted on the physical computing device in the same way that it is mounted on a virtual desktop, as described above. The ASV agent, in this case, runs in the operating system of the physical device and performs the functions of attaching the ASV in the device OS. Because the ASV itself may be in a remote location from the physical device, such as on a network share, where the ASV is accessed over a network, the same performance issues can arise when delivering applications from the ASV to the physical device as in the VDI setting, and particularly in the cloud-based VDI setting. To address these issues, the ASV applications can be pre-cached on the physical device by caching blocks of the applications used during launch in the cache of the physical device before the applications are launched by the user in a similar way as described above in the VDI setting. In this case, once the user signs into his or her session on the physical device, the ASV agent would begin the process of pre-caching the applications in the ASV using the techniques described above.

FIG. 6 illustrates an example of some general components of a computing device, in accordance with various embodiments. In this particular example, the device includes one or more processors (e.g., central processing units (CPUs) 602 for executing instructions that can be stored in a storage medium component. The storage medium can include many types of memory, persistent data storage, or non-transitory computer-readable storage media. For example, the storage medium may take the form of random access memory (RAM) 601 storing program instructions for execution by the processor(s) 602, a persistent storage (e.g., disk or SSD) 600, a removable memory for sharing information with other devices and/or the like. The computing device typically can further comprise a display component 603, such as a monitor, a touch screen, liquid crystal display (LCD), or the like. In various embodiments, the computing device will include at least one input device 605 able to receive conventional input from a user. This conventional input can include, for example, a push button, touch pad, touch screen, wheel, joystick, keyboard, mouse, keypad, or any other such device or element whereby a user can input a command to the device. In some embodiments, the computing device can include a network interface component (NIC) 604 for communicating over various networks, such as a Wi-Fi®, Bluetooth®, RF, wired, or wireless communication systems. The device in many embodiments can communicate over a network, such as the Internet, and may be able to communicate with other devices connected to the same or other network.

Various embodiments described herein can be implemented in a wide variety of environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Many embodiments utilize at least one network that would be familiar to those skilled in the art for supporting communications using any of a variety of commercially-available protocols, such as TCP/IP, FTP, UDP or the like. The network can be, for example, a local area network, a wide-area network, a virtual private network, the Internet, an intranet, an extranet, a public switched telephone network, an infrared network, a wireless network, and any combination thereof.

The various environments in which the embodiments can be implemented may include a variety of data stores and other memory and storage media, as discussed above. These can reside in a variety of locations, such as on a storage medium local to one or more of the computers or remote from any or all of the computers across the network. In some embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for multimedia redirection in a collaborative session on a virtual desktop, comprising:
   launching the virtual desktop and initiating the collaborative session on the virtual desktop, wherein a plurality of virtual desktop clients are connected to a virtual desktop agent via a plurality of main channels, respectively, the virtual desktop agent operating in the virtual desktop that conveys a graphical user interface (GUI) of the virtual desktop to the plurality of virtual desktop clients via the plurality of main channels, and receives client-side inputs into the virtual desktop via the plurality of main channels;
   establishing a plurality of side virtual channels, separate from the plurality of main channels, between the plurality of virtual desktop clients and the virtual desktop agent, respectively, at least one of the side virtual channels being marked as a main user virtual channel by the virtual desktop agent and at least one of the side virtual channels being marked as a shadow user virtual channel by the virtual desktop agent;
   receiving a request in the virtual desktop to play a media stream in a media player in the virtual desktop;
   intercepting the media stream in the virtual desktop without the media stream being rendered on the virtual desktop;
   multicasting the intercepted media stream together with metadata information that includes a window size and volume settings corresponding to the intercepted media stream to the plurality of virtual desktop clients connected to the virtual desktop in the collaborative session via the established plurality of side virtual channels, respectively;
   receiving a first control command for the media player in the virtual desktop from a first requesting virtual desktop client in the plurality of virtual desktop clients via a first one of the side virtual channels;
   determining, by the virtual desktop agent, that the first requesting virtual desktop client is designated as being enabled to produce control commands for the media player;
   in response to determining that the first requesting virtual desktop client is designated as being enabled to produce control commands for the media player, effectuating the first control command for the media player;
   receiving a second control command for the media player in the virtual desktop from a second requesting virtual desktop client in the plurality of virtual desktop clients via a second one of the side virtual channels;
   determining, by the virtual desktop agent, that the second requesting virtual desktop client is designated as not being enabled to produce control commands for the media player; and
   in response to determining that the second requesting virtual desktop client is designated as not being enabled to produce control commands for the media player, blocking or ignoring the second control command by the virtual desktop agent.

2. The method of claim 1, further comprising, by each of the plurality of virtual desktop clients:
   receiving the conveyed media stream; and
   rendering the received media stream in the virtual desktop client in a client media player.

3. The method of claim 2, further comprising adjusting, by each of the plurality of virtual desktop clients, a window size of the client media player based on the received metadata information when rendering the media stream.

4. The method of claim 1, further comprising:
   detecting that a new virtual desktop client connected to the virtual desktop in the collaborative session; and
   establishing a new side virtual channel between the new virtual desktop client and the virtual desktop agent for conveying the media stream to the new virtual desktop client, the new side virtual channel being marked as a shadow user virtual channel.

5. The method of claim 1, wherein
   the first requesting virtual desktop client is determined to be designated as being enabled to produce control commands for the media player in response to determining that a user of the first requesting virtual desktop client is an owner of the virtual desktop, and
   the second requesting virtual desktop client is determined to be designated as being not enabled to produce control commands for the media player in response to determining that a user of the second requesting virtual desktop client is not an owner of the virtual desktop.

6. The method of claim 1, wherein
   the first requesting virtual desktop client is determined to be designated as being enabled to produce control commands for the media player in response to determining that the first one of the side virtual channels is the main user virtual channel, and
   the second requesting virtual desktop client is determined to be designated as not being enabled to produce control commands for the media player in response to determining that the second one of the side virtual channels is the shadow user virtual channel.

7. A computing device for multimedia redirection in a collaborative session on a virtual desktop, comprising:
at least one processor; and
memory including instructions that, when executed by the at least one processor, cause the computing device to perform the steps of:
launching the virtual desktop and initiating the collaborative session on the virtual desktop, wherein a plurality of virtual desktop clients are connected to a virtual desktop agent via a plurality of main channels, respectively, the virtual desktop agent operating in the virtual desktop that conveys a graphical user interface (GUI) of the virtual desktop to the plurality of virtual desktop clients via the plurality of main channels, and receives client-side inputs into the virtual desktop via the plurality of main channels;
establishing a plurality of side virtual channels, separate from the plurality of main channels, between the plurality of virtual desktop clients and the virtual desktop agent, respectively, at least one of the side virtual channels being marked as a main user virtual channel by the virtual desktop agent and at least one of the side virtual channels being marked as a shadow user virtual channel by the virtual desktop agent;
receiving a request in the virtual desktop to play a media stream in a media player in the virtual desktop;
intercepting the media stream in the virtual desktop without the media stream being rendered on the virtual desktop; and
multicasting the intercepted media stream together with metadata information that includes a window size and volume settings corresponding to the intercepted media stream to the plurality of virtual desktop clients connected to the virtual desktop in the collaborative session via the established plurality of side virtual channels, respectively;
receiving a first control command for the media player in the virtual desktop from a first requesting virtual desktop client in the plurality of virtual desktop clients via a first one of the side virtual channels;
determining, by the virtual desktop agent, that the first requesting virtual desktop client is designated as being enabled to produce control commands for the media player;
in response to determining that the first requesting virtual desktop client is designated as being enabled to produce control commands for the media player, effectuating the first control command for the media player;
receiving a second control command for the media player in the virtual desktop from a second requesting virtual desktop client in the plurality of virtual desktop clients via a second one of the side virtual channels;
determining, by the virtual desktop agent, that the second requesting virtual desktop client is designated as not being enabled to produce control commands for the media player; and
in response to determining that the second requesting virtual desktop client is designated as not being enabled to produce control commands for the media player, blocking or ignoring the second control command by the virtual desktop agent.

8. The computing device of claim 7, wherein the memory further includes instructions that when executed by the at least one processor, cause the computing device to instruct each of the plurality of virtual desktop clients to perform the steps of:
receiving the conveyed media stream; and
rendering the received media stream in the virtual desktop client in a client media player.

9. The computing device of claim 8, wherein the memory further includes instructions that when executed by the at least one processor, cause the computing device to instruct each of the plurality of virtual desktop clients to perform the steps of:
adjusting a window size of the client media player based on the received metadata information when rendering the media stream.

10. The computing device of claim 7, wherein the memory further includes instructions that when executed by the at least one processor, cause the computing device to perform the steps of:
detecting that a new virtual desktop client connected to the virtual desktop in the collaborative session; and
establishing a new side virtual channel between the new virtual desktop client and the virtual desktop agent for conveying the media stream to the new virtual desktop client, the new side virtual channel being marked as a shadow user virtual channel.

11. The computing device of claim 7, wherein
the first requesting virtual desktop client is determined to be designated as being enabled to produce control commands for the media player in response to determining that a user of the first requesting virtual desktop client is an owner of the virtual desktop, and
the second requesting virtual desktop client is determined to be designated as being not enabled to produce control commands for the media player in response to determining that a user of the second requesting virtual desktop client is not an owner of the virtual desktop.

12. The computing device of claim 7, wherein
the first requesting virtual desktop client is determined to be designated as being enabled to produce control commands for the media player in response to determining that the first one of the side virtual channels is the main user virtual channel, and
the second requesting virtual desktop client is determined to be designated as not being enabled to produce control commands for the media player in response to determining that the second one of the side virtual channels is the shadow user virtual channel.

13. A non-transitory computer readable storage medium for multimedia redirection in a collaborative session on a virtual desktop, comprising one or more sequences of instructions, the instructions when executed by one or more processors causing the one or more processors to execute the operations of:
launching the virtual desktop and initiating the collaborative session on the virtual desktop, wherein a plurality of virtual desktop clients are connected to a virtual desktop agent via a plurality of main channels, respectively, the virtual desktop agent operating in the virtual desktop that conveys a graphical user interface (GUI) of the virtual desktop to the plurality of virtual desktop clients via the plurality of main channels, and receives client-side inputs into the virtual desktop via the plurality of main channels;
establishing a plurality of side virtual channels, separate from the plurality of main channels, between the plurality of virtual desktop clients and the virtual desktop agent, respectively, at least one of the side virtual channels being marked as a main user virtual channel by the virtual desktop agent and at least one of the side virtual channels being marked as a shadow user virtual channel by the virtual desktop agent;

receiving a request in the virtual desktop to play a media stream in a media player in the virtual desktop;

intercepting the media stream in the virtual desktop without the media stream being rendered on the virtual desktop;

multicasting the intercepted media stream together with metadata information that includes a window size and volume settings corresponding to the intercepted media stream to the plurality of virtual desktop clients connected to the virtual desktop in the collaborative session via the established plurality of side virtual channels, respectively;

receiving a first control command for the media player in the virtual desktop from a first requesting virtual desktop client in the plurality of virtual desktop clients via a first one of the side virtual channels;

determining, by the virtual desktop agent, that the first requesting virtual desktop client is designated as being enabled to produce control commands for the media player;

in response to determining that the first requesting virtual desktop client is designated as being enabled to produce control commands for the media player, effectuating the first control command for the media player;

receiving a second control command for the media player in the virtual desktop from a second requesting virtual desktop client in the plurality of virtual desktop clients via a second one of the side virtual channels;

determining, by the virtual desktop agent, that the second requesting virtual desktop client is designated as not being enabled to produce control commands for the media player; and in response to determining that the second requesting virtual desktop client is designated as not being enabled to produce control commands for the media player, blocking or ignoring the second control command by the virtual desktop agent.

14. The non-transitory computer readable storage medium of claim 13, further comprising instructions that when executed by the one or more processors cause the one or more processors to execute the operations of, by each of the plurality of virtual desktop clients:

receiving the conveyed media stream; and rendering the received media stream in the virtual desktop client in a client media player.

15. The non-transitory computer readable storage medium of claim 14, further comprising instructions that when executed by the one or more processors cause the one or more processors to execute the operations of:

adjusting, by each of the plurality of virtual desktop clients, a window size of the client media player based on the received metadata information when rendering the media stream.

16. The non-transitory computer readable storage medium of claim 13, further comprising instructions that when executed by the one or more processors cause the one or more processors to execute the operations of:

detecting that a new virtual desktop client connected to the virtual desktop in the collaborative session; and establishing a new side virtual channel between the new virtual desktop client and the virtual desktop agent for conveying the media stream to the new virtual desktop client, the new side virtual channel being marked as a shadow user virtual channel.

17. The non-transitory computer readable storage medium of claim 13, wherein the first requesting virtual desktop client is determined to be designated as being enabled to produce control commands for the media player in response to determining that a user of the first requesting virtual desktop client is an owner of the virtual desktop, and the second requesting virtual desktop client is determined to be designated as being not enabled to produce control commands for the media player in response to determining that a user of the second requesting virtual desktop client is not an owner of the virtual desktop.

18. The non-transitory computer readable storage medium of claim 13, wherein the first requesting virtual desktop client is determined to be designated as being enabled to produce control commands for the media player in response to determining that the first one of the side virtual channels is the main user virtual channel, and the second requesting virtual desktop client is determined to be designated as not being enabled to produce control commands for the media player in response to determining that the second one of the side virtual channels is the shadow user virtual channel.

* * * * *